United States Patent
Braspenning et al.

(10) Patent No.: US 7,046,850 B2
(45) Date of Patent: May 16, 2006

(54) IMAGE MATCHING

(75) Inventors: Ralph Antonius Cornelius Braspenning, Eindhoven (NL); Fabian Edgar Ernst, Eindhoven (NL); Cornelius Wilhelmus Antonius Marie Van Overveld, Eindhoven (NL); Piotr Wilinski, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 685 days.

(21) Appl. No.: 09/945,954

(22) Filed: Sep. 4, 2001

(65) Prior Publication Data

US 2002/0064310 A1    May 30, 2002

(30) Foreign Application Priority Data

Sep. 7, 2000    (EP) .................................. 00203080

(51) Int. Cl.
*G06K 9/62* (2006.01)
*G06K 9/64* (2006.01)

(52) U.S. Cl. ..................... 382/209; 382/217; 382/218; 382/219; 382/220; 382/221

(58) Field of Classification Search ............... 382/209, 382/217, 218, 219, 220, 221, 222
See application file for complete search history.

(56) References Cited

U.S. PATENT DOCUMENTS

| | | | |
|---|---|---|---|
| 5,072,293 A | 12/1991 | De Haan et al. ............. 358/105 |
| 6,445,822 B1* | 9/2002 | Crill et al. .................. 382/218 |
| 6,690,828 B1* | 2/2004 | Meyers ........................ 382/218 |
| 6,738,518 B1* | 5/2004 | Minka et al. ............... 382/218 |
| 6,751,363 B1* | 6/2004 | Natsev et al. ............... 382/305 |
| 6,775,410 B1* | 8/2004 | Loce et al. .................. 382/209 |

FOREIGN PATENT DOCUMENTS

EP    0504577 A2    2/1992

OTHER PUBLICATIONS

S. Kumar et al. "A New Technique for the Segmentation of Lumen from Endoscopic Images by Differential Region Growing", I.E.E.E. 1999, pp. 414-417.*
C-H Yag et al; "Motion-Based Video Segmentation Using Continuatin Method and Robust Cost Functions", SPIE Visual Communications and Image Processing, XX, XX, vol. 3309, Jan. 24, 1998, pp. 774-785, XP002168207.
Co-Pending Patent Application Titled "Segmentation of Digital Images" (Our Refernce No. NL000493).

* cited by examiner

*Primary Examiner*—Amir Ahmed
*Assistant Examiner*—Brian Le

(57) ABSTRACT

A method for matching digital images, including regularization of image features of a first digital image, composed of pixels, defining a finite set of candidate values, wherein a candidate value represents a candidate for a possible match between image features of the first image and a second image, establishing a matching penalty function for evaluation of the candidate values, evaluating the matching penalty function for every candidate value, selection of a candidate value based on the result of the evaluation of the matching penalty function, regularization of the first image by segmentation of the first image, comprising assigning at least part of the pixels of the first image to respective segments, determining a certainty parameter for at least part of the pixels of a segment, and establishing the matching penalty function to be at least partially based on the certainty parameter.

7 Claims, 1 Drawing Sheet

IMAGE MATCHING

Figure 1:
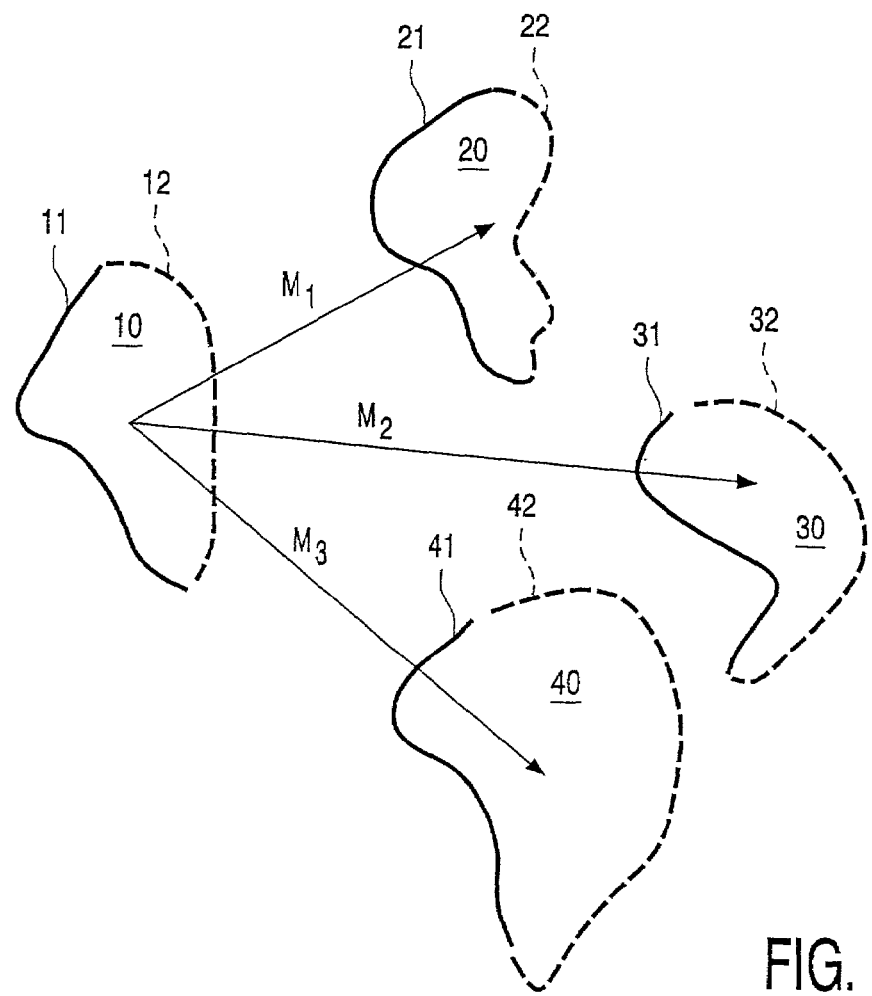

The matching of two or more images is used in image processing, and consists essentially of determining matching sections in subsequent images. Matching of images is an essential step in several fields of image processing, such as depth reconstruction, image data compression, and motion analysis.

The matching process includes the determination of image features in a first position in a first image, and determining the position of these image features in a second image. The information of the difference in position between the features in the first and second image, such as translation or rotation, can be used in further processing. For example, a translation of an image feature between two subsequent images can be used to get a measure of the speed of an object associated with the image feature.

Image matching can be performed by context independent processing, implemented in universal image processing hard or software for use with for example MPEG (de)coding and television scan rate conversion. In these applications subsequent digital images of a video stream are matched. The general method used in such processing is as follows.

From a video stream two subsequent images are to be matched; let these images be the 2-dimensional digital images $I_1(x,y)$ and $I_2(x,y)$. The matching of these two images comprises the calculation of a pair of functions $M=M_x(x,y)$ and $M=M_y(x,y)$, that ideally map every pixel in the image $I_1$ to a pixel in image $I_2$, according to $$I_2(x,y)=I_1(x+M_x(x,y),y+M_y(x,y)).$$

These functions M contain information about how pixels or features have moved between the two images. The functions M can for example be interpreted as the apparent motion of pixels in the video stream, and give a motion vector for each pixel. This motion vector can for example be used in depth reconstruction from 2-dimensional images, in natural motion for scanrate upconversions in television and in MPEG compression. The matching of images therefore consists of finding the functions M.

The definition for M as a function, which is defined independently for all pixels, causes that the problem of finding M is ill-posed. The construction of M is very problematic and incurs substantial costs, both in time and calculation power, if a function M can be determined at all. To simplify the problem of finding M, regularization of the function M has been proposed. From U.S. Pat. No. 5,072,293 a method is known in which the function M is set to be constant over pre-defined blocks within the images, that are fixed with respect to the image frame. This approach simplifies the problem of finding M, and reduces the costs needed to find function M. A disadvantage of this method is that the calculations still are costly.

It is an objective of the invention to provide a method for matching sections of subsequent images that is more effective and significantly faster than the known method.

To achieve this objective, the invention provides a method and device for segmenting an image, a computer program, a tangible medium, a signal and a display apparatus as defined in the independent claims.

In a first embodiment of the invention, images are matched by regularizing a first image by means of segmentation, including assigning at least part of the pixels of said first image to respective segments, determining a certainty parameter for at least part of the pixels of a segment, and establishing a matching penalty function to be at least partially based on the certainty parameter. By regularization of the first image by means of segmentation, and providing the segments with certainty information, the matching process according to the invention can be performed efficiently and fast. If quasi segmentation is used, the effort needed to segment the images and providing the certainty information can be significantly reduced. Quasi segmentation is described in applicants co-pending patent application titled "Segmentation of digital images" (our reference PHNL000493).

Figure 2:
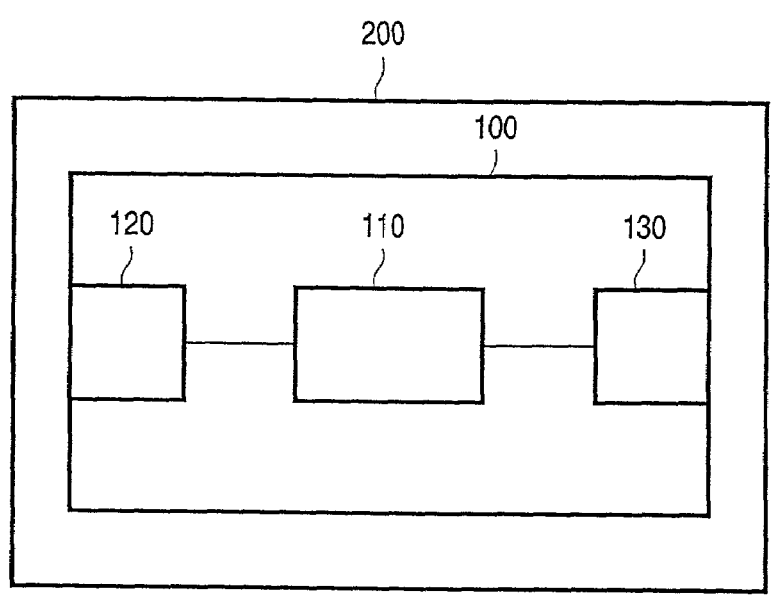

Particularly advantageous elaborations of the invention are set forth in the dependent claims. Further objects, elaborations, modifications, effects and details of the invention appear from the following description, in which reference is made to the drawings, in which FIG. 1 schematically illustrates an example of a segment matching process, and FIG. 2 schematically shows a device for matching digital images.

In the following example of an embodiment of the invention, the matching of two images will be explained. These images can be subsequent images from a video stream, but the invention is not limited thereto. The images are digital images consisting of image pixels and defined as two 2-dimensional digital images $I_1(x,y)$ and $I_2(x,y)$, wherein x and y are the co-ordinates indicating the individual pixels of the images.

The matching of these two images includes the calculation of a pair of functions $M=M_x(x,y)$ and $M=M_y(x,y)$. M is defined as before as to map every pixel in the image $I_1$ to a pixel in image $I_2$, according to the formula $$I_2(x,y)=I_1(x+M_x(x,y),y+M_y(x,y)).$$

According to an embodiment of the invention, the construction of M is modified by redefining M as a function that is constant for groups of pixels having a similar motion by modifying the previous definition of M by $$I_2(x,y)=I_1(x+M_x(G(x,y)),y+M_y(G(x,y))).$$

The function G is introduced to keep M constant for a collection of pixels with similar motion. The introduction of the function G is a regularization of the matching problem, which modification significantly reduces the effort required to find M.

A collection of pixels for which M is said to be constant is composed of pixels that are suspected of having a similar motion. To find such collections, the images are divided into segments by means of segmentation. Segmentation of an image amounts to deciding for every pixel in the image, the membership to one of a finite set of segments, wherein a segment is a connected collection of pixels. An advantageous method of segmentation is partial segmentation wherein membership of a pixel to a segment is decided on basis of image related attributes of the pixels such as color, luminance, and texture. Segments that result from partial segmentation do not necessarily correspond directly with image objects, but the pixels in a certain segment still have a very high probability of having similar motion. A particular advantageous method of segmentation is the so-called quasi segmentation, described in applicants co-pending patent application titled "Segmentation of digital images" (our reference PHNL000493), the text of which is considered to be incorporated herein by reference. With quasi segmentation images can be segmented very quickly and efficiently.

The image $I_1$ is divided into segments, by means of the aforementioned method of quasi segmentation, resulting in segments consisting of pixels that are bound by borders defining the respective segment. As a result of quasi segmentation, the segments are defined by hard border sections and soft border sections. Hard border sections result from analysis of image features, and have a high certainty to be a relevant segment border. The soft border sections are determined by means of calculation of distances to detected hard border sections, and therefore have a lower certainty to be a relevant segment border. The better a border section corresponds with the image content, the more relevant that border section is. According to an embodiment of the present invention, the matching of images in the form of matching segments is done with priority for the matching of high certainty features of the respective segments.

In FIG. 1, a segment 10 of image $I_1$ is shown, determined by quasi segmentation and bound by a hard border section 11 (indicated by a solid line) and a soft border section 12 (indicated by a dashed line). To determine the displacement function for the segment 10 between image $I_1$ and image $I_2$, a projection of the segment 10 in the image $I_2$ needs to be found that matches segment 10, which yields consequently the displacement function M. This is done by selecting a number of possible match candidates of image $I_2$ for the match with segment 10, calculating a matching criterion for each candidate and selecting the candidate with the best matching result. The matching criterion is a measure of the certainty that the segment of the first image matches with a projection in the second image.

Candidates of image $I_2$ for a match with segment 10 are shown in FIG. 1 as projections 20, 30, 40 of image $I_2$, bound respectively by hard border sections 21, 31, 41 and soft border sections 22, 32, 42. For each of the projections 20, 30, 40 the function M is indicated by the respective arrows M1, M2, M3. Consequently M1, M2, and M3 can be considered candidate values for the function M. To determine which of the candidate projections 20, 30, 40 matches best with segment 10, a matching criterion has to be calculated for each projection 20, 30, 40. According to the invention, the matching criterion does give more weight to the high certainty hard border sections in the evaluation of candidate projections and candidate values for M. Therefore a match between hard border sections of the segment and a border section of projection gives a much higher certainty for a match than a match of soft border sections of the segment.

The matching criterion is used in digital imaging processing and is known in its implementation as minimizing a matching error or matching penalty function. Such functions and methods of matching by minimizing a matching function per se are known in the art, for example from "Sub-pixel motion estimation with 3-D recursive search block-matching" by De Haan and Biezen, published in Signal Processing: Image Communication 6 (1994) 229–239.

A finite set of i candidates $M_x$ and $M_y$, being the function M in both x and y co-ordinates is defined by:

$$\{(M_{x;i}, M_{y;i}) | i=1,2,3, \ldots \}.$$

The selection of a finite set of candidates $M_x$ and $M_y$ per se is known in the art, for example from the above-mentioned publication of De Haan and Biezen. Preferably, the set of candidates is kept small to reduce the number of calculations required to evaluate each candidate. With each candidate a candidate projection is associated.

The collection of pixels in a segment is denoted by $\Omega$. The match penalty $P_i$ for the i-th candidate is defined by:

$$P_i = \sum_{(x,y) \in \Omega} |I_1(x, y) - I_2(x + M_{x;i}, y + M_{y;i})|.$$

This match penalty function gives equal weight to every pixel in a segment. As mentioned before, pixels of a segment do not have the same certainty to belong to the segment. To take this into account the match penalty function is revised to read:

$$P'_i = \sum_{(x,y) \in \Omega} w(x, y) |I_1(x, y) - I_2(x + M_{x;i}, y + M_{y;i})|.$$

The weighing function w(x,y) is a function, which assigns a certainty-weighing factor to each pixel, so that pixels with a high certainty contribute more to the evaluation of the penalty function. In this embodiment the value of w(x,y) is related to the distance d(x,y) of a pixel to a hard border section of the segment and decreases with the distance from a hard border section. Any suitable definition for the distance can be used, such as the Euclidean, "city block", "chessboard" or a distance transform as described in above-mentioned co-pending application PHNL000493. For w(x, y) any suitable function can be chosen, as long as the value of the function decreases with the distance from a segment border. As examples a number of functions are shown next, for the one-dimensional case w(x,y); the two dimensional function will be obvious to the man skilled in the art. Non limiting examples are:

$w(x)=1/d(x),$ $w(x)=1/d(x)^2,$ $w(x)=1$ if $d(x)<1.5$; $w(x)=0$ if $d(x) \geq 1.5,$ $w(x)=(5-d(x))/4$ if $x<5$; $d(x)=0$ if $x \geq 5,$ $w(x)=(5^2-d(x)^2)/(5^2-1)$ if $d(x)<5$; $w(x)=0$ if $d(x) \geq 5,$ and $w(x)=(15^2-d(x)^2)/(15^2-1)$ if $d(x)<15$; $w(x)=0$ if $d(x) \geq 15.$ Note that all of the functions lead to a decreased value with increasing distance to a hard border section. In case of function III the value is constant over a predetermined distance, and beyond that distance the value is zero, thus also leading to a decreased value with increasing distance. Functions III–VI restrict the calculations to only a fixed number of closest pixels; this further decreases the number of calculations required. If the segmentation of the images was performed using the preferred method of quasi segmentation, the distance to the nearest hard border section of the segment to which a pixel belongs is already known from the segmentation process, in the form of the information in the distance array. This leads to the advantage of significantly reduced calculations for the matching process.

In the embodiment shown the certainty function is related to the distance of a pixel to a hard border section. The invention however is not limited to this example; other methods of assigning a certainty value to each pixel can also be used. In that case a certainty array w(x,y) has to be filled with weighing factors for each pixel, related to the segment to which the respective pixels belong.

The invention can also be used for matching image sections within a single image, for example for use in pattern or image recognition.

The invention further relates to a computer program product comprising computer program code sections for performing the steps of the method of the invention when run on a computer. The computer program product of the invention can be stored on a suitable information carrier such as a hard or floppy disc or CD-ROM or stored in a memory section of a computer.

The invention further relates to a device 100 shown in FIG. 2 for matching digital images. The device 100 is provided with a processing unit 110 for matching digital images according to the method as described above. The processing unit 110 is connected with an input section 120 by which digital images can be received and put through to the unit 110. The unit 110 is further connected to an output section 130 through the resulting found matches between images can be outputted. The device 100 may be included in a display apparatus 200, the display apparatus being for example a (3-dimensional) television product.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, the invention provides matching digital images, including regularization of image features of a first digital image, composed of pixels, defining a finite set of candidate values, wherein a candidate value represents a candidate for a possible match between image features of the first image and a second image, establishing a matching penalty function for evaluation of the candidate values, evaluating the matching penalty function for every candidate value, selection of a candidate value based on the result of the evaluation of the matching penalty function, regularization of the first image by segmentation of the first image, comprising assigning at least part of the pixels of the first image to respective segments, determining a certainty parameter for at least part of the pixels of a segment, and establishing the matching penalty function to be at least partially based on the certainty parameter.

The invention claimed is:

1. A method for matching digital images, the method comprising the steps of:
   regularizing image features of a first digital image ($I_1$) composed of pixels,
   providing a second digital image ($I_2$), composed of pixels,
   defining a finite set of candidate values ($M_{x,ji}$, $M_{y,ji}$), wherein a candidate value represents a candidate for a possible match between image features of said first image and image features of said second image,
   establishing a matching penalty function ($P'_i$) for evaluation of said candidate values ($M_{x,ji}$, $M_{y,ji}$),
   evaluating the matching penalty function ($P'_i$) for every candidate value ($M_{x,ji}$, $M_{y,ji}$), and
   selecting a candidate value ($M_{x,ji}$, $M_{y,ji}$) based on the result of the evaluation of the matching penalty function,
   characterized by
   regularizing said first image by segmentation of said first image, including assigning at least part of the pixels of said image to respective segments, wherein said segmentation further includes the step of detecting, based on said features of said first image, an edge along at least a fragment of a border of at least one of said respective segments, wherein a certainty parameter ($w(x,y)$) is based on a distance ($d(x,y)$) of said edge to a corresponding pixel of the one respective segment, said edge being a hard border section, said segmentation being based on hard border sections and soft border sections, said soft border sections being determined by means of calculation of distances ($d(x,y)$) to detected hard border sections and therefore have a lower certainty to be a relevant segment border,
   determining the certainty parameter ($w(x,y)$) for at least part of the pixels of a segment, and
   establishing the matching penalty function ($P'_i$) to be at least partially based on the certainty parameter ($w(x,y)$).

2. A method according to claim 1, wherein the segmentation is achieved by means of quasi segmentation for distinguishing, based on edge detection, between a hard border section and a soft border section of a segment to be identified by said quasi segmentation.

3. A computer program, embodied within a computer-readable medium, for enabling a processor to carry out the method according to claim 1.

4. Said computer-readable medium of claim 4 carrying said computer program of claim 3.

5. A signal, embodied within a computer-readable medium, carrying a computer program for enabling a processor to carry out the method of claim 1.

6. Device for matching digital images, the device comprising:
   an input section (120) for receiving digital images,
   an output section (130) for outputting matching results.
   means (110) for regularizing image features of a first digital image ($I_1$), composed of pixels, means (110) for providing a second candidate image ($I_2$), composed of pixels,
   means (110) for defining a finite set of candidate values ($M_{x,ji}$, $M_{y,ji}$), wherein a candidate value represents a candidate for a possible match between image features of said first image and image features of said second image,
   means (110) for establishing a matching penalty function ($P'_i$) for evaluation of said candidate values ($M_{x,ji}$, $M_{y,ji}$),
   means (110) for evaluating the matching penalty function ($P'_i$) for every candidate value ($M_{x,ji}$, $M_{y,ji}$), and
   means (110) for selecting a candidate value ($M_{x,ji}$, $M_{y,ji}$) based on the result of the evaluation of the matching penalty function,
   characterized in that the device further comprises:
   means (110) for regularizing said first image by segmentation of said first image, including assigning at least part of the pixels of said image to respective segments, wherein said segmentation further includes the step of detecting, based on said features of said first image, an edge along at least a fragment of a border of at least one of said respective segments, wherein a certainty parameter (w(x,y)) is based on a distance (d(x,y)) of said edge to a corresponding pixel of the one respective segment, said edge being a hard border section, said segmentation being based on hard border sections and soft border sections, said soft border sections being determined by means of calculation of distances d(x,y) ) to detected hard border sections and therefore have a lower certainty to be a relevant segment border, means (110) for determining the certainty parameter (w(x, y)) for at least part of the pixels of a segment, and means (110) for establishing the matching penalty function ($P'_i$) to be at least partially based on the certainty parameter (w(x,y)).

7. Display apparatus comprising a device as claimed in claim 6.

* * * * *